US009630853B2

(12) United States Patent
Sato et al.

(10) Patent No.: US 9,630,853 B2
(45) Date of Patent: Apr. 25, 2017

(54) METHOD OF PREPARING POLYCRYSTALLINE DIAMOND

(71) Applicants: Sumitomo Electric Industries, Ltd., Osaka-shi (JP); SUMITOMO ELECTRIC HARDMETAL CORP., Hyogo (JP)

(72) Inventors: Takeshi Sato, Hyogo (JP); Katsuko Yamamoto, Hyogo (JP); Naohiro Toda, Hyogo (JP); Hitoshi Sumiya, Hyogo (JP); Yutaka Kobayashi, Hyogo (JP)

(73) Assignees: SUMITOMO ELECTRIC INDUSTRIES, LTD., Osaka (JP); SUMITOMO ELECTRIC HARDMETAL CORP., Hyogo (JP)

( * ) Notice: Subject to any disclaimer, the term of this patent is extended or adjusted under 35 U.S.C. 154(b) by 0 days.

(21) Appl. No.: 14/738,116

(22) Filed: Jun. 12, 2015

(65) Prior Publication Data
US 2015/0274535 A1 Oct. 1, 2015

Related U.S. Application Data

(63) Continuation of application No. 12/600,618, filed as application No. PCT/JP2009/051940 on Feb. 5, 2009, now abandoned.

(30) Foreign Application Priority Data

| Feb. 6, 2008 | (JP) | 2008-026505 |
| Apr. 30, 2008 | (JP) | 2008-118375 |
| Apr. 30, 2008 | (JP) | 2008-118376 |
| Apr. 30, 2008 | (JP) | 2008-118377 |
| Apr. 30, 2008 | (JP) | 2008-118378 |
| Sep. 24, 2008 | (JP) | 2008-244329 |

(51) Int. Cl.
*C01B 31/06* (2006.01)
*B82Y 30/00* (2011.01)
*C03B 33/10* (2006.01)
*C04B 35/528* (2006.01)
*C04B 35/645* (2006.01)
*B26F 3/00* (2006.01)

(52) U.S. Cl.
CPC .............. *C01B 31/06* (2013.01); *B82Y 30/00* (2013.01); *C03B 33/107* (2013.01); *C04B 35/528* (2013.01); *C04B 35/645* (2013.01); *B26F 3/004* (2013.01); *C04B 2235/425* (2013.01); *C04B 2235/5427* (2013.01); *C04B 2235/5436* (2013.01); *C04B 2235/5445* (2013.01); *C04B 2235/5454* (2013.01); *C04B 2235/5481* (2013.01); *C04B 2235/72* (2013.01); *C04B 2235/781* (2013.01); *C04B 2235/785* (2013.01); *Y10T 428/218* (2015.01); *Y10T 428/268* (2015.01)

(58) Field of Classification Search
CPC ......... B26F 3/004; B82Y 30/00; C01B 31/06; C03B 33/107; C04B 2235/425; C04B 2235/5427; C04B 2235/5436; C04B 2235/5445; C04B 2235/5454; C04B 2235/5481; C04B 2235/72; C04B 2235/781; C04B 2235/785
See application file for complete search history.

(56) References Cited

U.S. PATENT DOCUMENTS

| 5,363,556 A | 11/1994 | Banholzer et al. |
| 2008/0022806 A1 | 1/2008 | Sumiya |
| 2009/0305039 A1* | 12/2009 | Sumiya ................. 428/402 |

FOREIGN PATENT DOCUMENTS

| CN | 1771356 A | 5/2006 | |
| JP | 10270407 A | 10/1998 | |
| JP | 10310838 A | 11/1998 | |
| JP | H11291437 A | 10/1999 | |
| JP | 2000061897 A | 2/2000 | |
| JP | 2002187775 A | 7/2002 | |
| JP | 2003025118 A | 1/2003 | |
| JP | 2003181326 A | 7/2003 | |
| JP | 2003192435 A | 7/2003 | |
| JP | 2003292397 * | 10/2003 | ............. C30B 29/04 |
| JP | 2003292397 A | 10/2003 | |
| JP | 2004131336 A | 4/2004 | |

(Continued)

OTHER PUBLICATIONS

Chinese Office Action for related Chinese Application No. 200410010174.6 dated Mar. 27, 2015, 16 pages.
Korean Office Action for related Korean Patent Application No. 10-2009-7023444 dated Jul. 2, 2015, 13 pages.
Office Action for Corresponding Taiwanese Patent Application No. 098103966 dated Sep. 12, 2013.
Decision on Grant for corresponding Russian Patent Application No. 2009142848, dated Feb. 21, 2014, 12 pages.
Notification of the Office Action for corresponding Russian Patent Application No. 2009142848, dated Feb. 26, 2013, pp. 1-8.

(Continued)

*Primary Examiner* — Shuangyi Abu Ali
(74) *Attorney, Agent, or Firm* — Ditthavong & Steiner, P.C.

(57) ABSTRACT

An object is to provide polycrystalline diamond applicable to diverse applications; and a water jet orifice, a stylus for gravure printing, a scriber, a diamond cutting tool, and a scribing wheel that include such polycrystalline diamond. This object is achieved by polycrystalline diamond obtained by converting and sintering non-diamond carbon under an ultrahigh pressure and at a high temperature without addition of a sintering aid or a catalyst, wherein sintered diamond grains constituting the polycrystalline diamond have an average grain diameter of more than 50 nm and less than 2500 nm and a purity of 99% or more, and the diamond has a D90 grain diameter of (average grain diameter+average grain diameter×0.9) or less.

5 Claims, No Drawings

(56) References Cited

FOREIGN PATENT DOCUMENTS

| | | | |
|---|---|---|---|
| JP | 2004168554 A | 6/2004 | |
| JP | 2004181591 A | 7/2004 | |
| JP | 2005047194 A | 2/2005 | |
| JP | 2005289703 A | 10/2005 | |
| JP | 2006007677 A | 1/2006 | |
| JP | 2006123137 A | 5/2006 | |
| JP | 2006159348 A | 6/2006 | |
| JP | 2006518699 A | 8/2006 | |
| JP | 3855029 A | 12/2006 | |
| JP | 3855029 B2 | 12/2006 | |
| JP | 2007022888 A | 2/2007 | |
| JP | 2007031200 A | 2/2007 | |
| JP | 2007099559 A | 4/2007 | |
| SU | 368937 A1 | 2/1973 | |
| WO | 03051784 A1 | 6/2003 | |
| WO | 2004074557 A1 | 9/2004 | |
| WO | 2005065809 A1 | 7/2005 | |
| WO | 2007011019 A1 | 1/2007 | |
| WO | WO2007/011019 * | 1/2007 | ............ C03B 29/04 |
| WO | 2009099130 A1 | 8/2009 | |

OTHER PUBLICATIONS

Vereschagin L.F., "Synthetic Diamonds and Hydrostatic Extrusion," Moscow, 'Nauka' Publisher, 1982, pp. 49-51.
Office Action for corresponding Japanese Patent Application No. 2009-523498, issued on Jul. 29, 2013, w/ partial English translation, 5 pages.
English abstract and Japanese Article for Sumiya et al., "High Pressure Synthesis of High-Purity Polycrystalline Diamonds by Direct Conversion from Various Carbon Materials and their Characterization", The Review of High Pressure Science and Technology, vol. 16, No. 3, The Japanese Society of High Pressure Science and Technology, Aug. 20, 2006, pp. 207-215.
English abstract and Japanese Article of Sumiya et al., "Synthesis of High-purity Nano-Polycrystalline Diamond and Its Characterization", (n.d), pp. 1-7, Japan.
International Search Report for PCT/JP2009/051940, dated Mar. 10, 2009, pp. 1-5.
Chinese Office Action for related Chinese Patent Application No. 200980000366.6 dated Mar. 7, 2012, pp. 1-11.
Jiajun Sun, "Water Jet Cutting Technology", University of Mining and Technology Press, pp. 93-97.

* cited by examiner

METHOD OF PREPARING POLYCRYSTALLINE DIAMOND

RELATED APPLICATIONS

The present application is a Continuation Application of U.S. application Ser. No. 12/600,618, filed on Nov. 17, 2009, which is a national stage entry of PCT/JP2009/051940, filed on Feb. 5, 2009, which claims priority to JP 2008-244329, filed on Sep. 24, 2008, JP 2008-118375, filed on Apr. 30, 2008, JP 2008-118376, filed on Apr. 30, 2008, JP 2008-118377, filed on Apr. 30, 2008, JP 2008-118378, filed on Apr. 30, 2008, and JP 2008-026505, filed on Feb. 6, 2008, the entire contents of which are incorporated herein by reference.

TECHNICAL FIELD

The present invention relates to polycrystalline diamond obtained by converting and sintering non-diamond carbon without addition of a sintering aid or a catalyst.

BACKGROUND ART

Natural and artificial monocrystalline diamonds have been used for various applications because of their excellent properties. A tool including monocrystalline diamond is, for example, a water jet orifice (Patent Document 1), a stylus for gravure printing (Patent Documents 2 and 3), a scriber (Patent Document 4), a diamond cutting tool (Patent Documents 5 and 6), or a scribing wheel (Patent Document 7).

However, such monocrystalline diamond also has a property that abrasion losses vary (uneven wear) depending on crystal orientations of the diamond. For example, abrasion loss considerably varies between the (111) plane and the (100) plane. For this reason, monocrystalline diamond applied to such tools described above is worn away only in a specific plane in a short time as the tools are used, and predetermined effects are not provided, which has been a problem.

Monocrystalline diamond also has a property of cleaving along the (111) plane. For this reason, when monocrystalline diamond is applied to a tool subjected to a stress during use, the tool breaks or cracks, which also has been a problem.

To deal with the property of uneven wear and the cleaving property of monocrystalline diamond, sintered diamond may be used. Such sintered diamond is obtained by sintering diamond grains with a metal binder such as cobalt and hence the metal binder is present among the diamond grains. The metal binder region is softer than the diamond grains and hence is worn away in a short time. As the amount of the binder decreases, the diamond grains come off and the effects are not provided with stability for a long period of time. There is also a problem in that adhesive wear occurs between the metal binder region and a metal material being worked and working for a long period of time cannot be performed.

To solve such a problem caused by a metal binder, a binderless sintered diamond may be produced by dissolving the metal binder with acid to thereby remove the metal binder. However, removal of a metal binder reduces the binding power of diamond grains, which most likely increases abrasion loss.

For polycrystalline diamond free from a metal binder, there is a polycrystalline diamond obtained by chemical-vapor deposition (CVD). However, this polycrystalline diamond has a small binding strength among grains and hence suffers from large abrasion loss, which has been a problem.

Hereinafter, the above-described tools are specifically described.

A water jet orifice including monocrystalline diamond has a problem in that a target cutting width is no longer achieved after the lapse of usage time.

This is caused by the following mechanism. In such an orifice composed of monocrystalline diamond, diamond crystals in the interior surface of an orifice bore have various crystal orientations toward surroundings. The orifice having the shape of a cylinder at the initial stage of use suffers from abrasion in a plane susceptible to abrasion in a short time. As a result, the cylindrical shape of the orifice is lost and the interior surface is expanded into the shape of a polygon such as hexagon.

To deal with such deformation into a polygonal shape caused by uneven wear, sintered diamond may be used (Patent Document 8). However, this causes coming off of diamond grains with a decrease in the amount of a binder as described above and an orifice bore is expanded. Thus, a cutting width is not provided with stability for a long period of time, which is a problem. In particular, a water jet intended to provide enhanced cutting efficiency is configured to expel liquid containing water and rigid particles (alumina or the like) at a high pressure. As a result, a metal binder region, which is softer than diamond grains, wears away in a short time and a cutting width is not provided with stability for a long period of time, which is a problem.

To cover the interior surface of an orifice with polycrystalline diamond free from a metal binder, a method may be used in which the interior surface of a metal orifice bore is coated with a diamond thin film free from a metal binder by CVD (chemical-vapor deposition) as described above (see Patent Document 9). However, such a diamond thin film has a short wear life, and has a small binding strength among grains and hence has a short wear life, which has been a problem.

Another example is a stylus for gravure printing in which natural or artificial monocrystalline diamond is used as material for the stylus (see Patent Documents 2 and 3). However, possibly because such diamond has a property of cleaving, such a tool breaks or cracks by a stress during use, which is a problem. Due to the property of uneven wear, such diamond is worn away only in a specific plane in a short time as the tool is used, and hence working for a long period of time cannot be performed, which has also been a problem.

Still another example is a scriber including monocrystalline diamond. For example, as shown in Patent Document 4, polyhedron-shaped monocrystalline diamond is used to scribe monocrystalline substrates, glass substrates, and the like with a vertex of the polyhedron, the vertex serving as a blade. Such a scriber composed of monocrystalline diamond is produced by working monocrystalline diamond such that the (111) plane, which is the most resistant to abrasion against a workpiece that is to be scribed and is composed of a monocrystalline material such as sapphire, is particularly positioned to be aligned parallel to the work to be scribed.

However, possibly because monocrystalline diamond has a property of cleaving along the (111) plane as described above, scribers composed of monocrystalline diamond crack or wear unevenly when a plane used for scribing only slightly deviates from the (111) plane, which has been a problem.

Still another example is a diamond cutting tool in which natural or artificial monocrystalline diamond is used as material for the tool (see Patent Documents 5 and 6).

However, because of the problems of the cleaving property and the property of uneven wear of monocrystalline diamond as described above, such a tool composed of monocrystalline diamond has a problem in that the tool breaks or cracks due to a stress during use, is worn away only in a specific plane in a short time as the tool is used, and working for a long period of time cannot be performed.

Still another example is a scribing wheel in which monocrystalline diamond is used as material for the scribing wheel. For example, as shown in Patent Document 7, scribed lines are formed in a brittle material such as glass for liquid crystal panels with the V-shaped edge of the wheel, the edge serving as a cutting edge.

However, as with other tools, such a scribing wheel breaks or cracks due to a stress during use because of the problem of the cleaving property of monocrystalline diamond, which has been a problem.

Due to the property of uneven wear, such a tool is worn away only in a specific plane in a short time as the tool is used, and use of the tool for a long period of time is not possible, which has been a problem. A scribing wheel composed of monocrystalline diamond has a V-shaped edge in which crystals have various crystal orientations in the circumferential direction. Thus, the edge having the shape of a perfect circle at the initial stage of use is worn away in a plane susceptible to wear in a short time and the perfect circular shape is deformed into the shape of a polygon. As a result, the wheel becomes no longer able to roll, which has been a problem.

To deal with the cleaving property and the property of uneven wear in the above-described various tools, a sintered diamond compact may be used as material for such tools, the compact containing metal serving as a binder (Patent Documents 7 and 10).

However, even though sintered diamond is used, the following problems are likely to occur: a metal binder region containing cobalt or the like is softer than diamond grains and hence wears away in a short time, and adhesive wear occurs between the metal binder region and a metal material being worked such as copper and working for a long period of time cannot be performed. Such a metal binder in the sintered diamond compact may be removed by dissolving the metal binder with acid. However, this reduces the binding power of diamond grains, which most likely increases abrasion loss.

Polycrystalline diamond that is produced by CVD and is free from a metal binder has a small binding strength among grains and hence probably has a problem in that such diamond has a short wear life.

[Patent Document 1] Japanese Unexamined Patent Application Publication No. 2000-061897
[Patent Document 2] Japanese Unexamined Patent Application Publication No. 2006-123137
[Patent Document 3] Japanese Unexamined Patent Application Publication No. 2006-518699
[Patent Document 4] Japanese Unexamined Patent Application Publication No. 2005-289703
[Patent Document 5] Japanese Unexamined Patent Application Publication No. 2004-181591
[Patent Document 6] Japanese Unexamined Patent Application Publication No. 2003-025118
[Patent Document 7] Japanese Unexamined Patent Application Publication No. 2007-031200
[Patent Document 8] Japanese Unexamined Patent Application Publication No. 10-270407
[Patent Document 9] Japanese Unexamined Patent Application Publication No. 2006-159348
[Patent Document 10] International Publication No. 2003/051784

DISCLOSURE OF INVENTION

Problems to be Solved by the Invention

In view of the problems described above, an object of the present invention is to provide a polycrystalline diamond applicable to diverse applications; and a water jet orifice, a stylus for gravure printing, a scriber, a diamond cutting tool, and a scribing wheel that include such a polycrystalline diamond.

In particular, an object of the present invention is to provide a water jet orifice that provides a cutting width with stability for a long period of time, a stylus for gravure printing, a scriber, a diamond cutting tool, and a scribing wheel that enable stable working for a long period of time, compared with conventional tools including monocrystalline diamonds and sintered diamond compacts containing metal binders.

Means for Solving the Problems

To solve the above-described problems, the inventors of the present invention have performed thorough studies. As a result, they have found that a polycrystalline diamond is advantageously applicable to diverse applications, the polycrystalline diamond not containing a metal binder such as cobalt, having an average grain diameter of more than 50 nm and less than 2500 nm and a purity of 99% or more, and the D90 grain diameter of the sinter being (average grain diameter+0.9×average grain diameter) or less. Thus, they have accomplished the present invention.

Specifically, the present invention is directed to, as described below, a polycrystalline diamond; a water jet orifice, a stylus for gravure printing, a scriber, a diamond cutting tool, and a scribing wheel that include such a polycrystalline diamond and allow stable working for a long period of time.

<Polycrystalline Diamond>
(1) Polycrystalline diamond obtained by converting and sintering non-diamond carbon under an ultrahigh pressure and at a high temperature without addition of a sintering aid or a catalyst, wherein sintered diamond grains constituting the polycrystalline diamond have an average grain diameter of more than 50 nm and less than 2500 nm and a purity of 99% or more, and the diamond has a D90 grain diameter of (average grain diameter+average grain diameter×0.9) or less.
(2) The polycrystalline diamond according to (1) above, wherein the sintered diamond grains have a D90 grain diameter of (average grain diameter+average grain diameter×0.7) or less.
(3) The polycrystalline diamond according to (1) above, wherein the sintered diamond grains have a D90 grain diameter of (average grain diameter+average grain diameter×0.5) or less.
(4) The polycrystalline diamond according to any one of (1) to (3) above, wherein the polycrystalline diamond has a hardness of 100 GPa or more.
(5) The polycrystalline diamond according to any one of (1) to (4) above, wherein the non-diamond carbon is a carbon material having a graphite-type layer structure.

<Water Jet Orifice>
(6) A water jet orifice including the polycrystalline diamond according to any one of (1) to (5) above.

(7) The water jet orifice according to (6) above, wherein an interior surface of an orifice bore through which water jet fluid passes, the bore being formed in the polycrystalline diamond, has a surface roughness Ra of 300 nm or less.
(8) The water jet orifice according to (6) or (7) above, wherein the orifice bore formed in the polycrystalline diamond has a diameter of 10 μm or more and 500 μm or less.
(9) The water jet orifice according to any one of (6) to (8) above, wherein a ratio (L/D) of an orifice level (L) to an orifice bore diameter (D) is 10 to 500, the orifice bore being formed in the polycrystalline diamond.
(10) The water jet orifice according to (6) or (7) above, wherein the orifice bore formed in the polycrystalline diamond has a diameter of more than 500 μm and 5000 μm or less.
(11) The water jet orifice according to any one of (6), (7), and (10) above, wherein a ratio (L/D) of an orifice level (L) to an orifice bore diameter (D) is 0.2 to 10, the orifice bore being formed in the polycrystalline diamond.

<Stylus for Gravure Printing>
(12) A stylus for gravure printing including the polycrystalline diamond according to any one of (1) to (5) above.

<Scriber>
(13) A scriber including the polycrystalline diamond according to any one of (1) to (5) above.
(14) The scriber according to (13) above, wherein a cutting face at a tip of the scriber has a shape of a polygon including three or more edges and the edges, in part or entirety, of the polygon are used as a blade.

<Diamond Cutting Tool>
(15) A diamond cutting tool including the polycrystalline diamond according to any one of (1) to (5) above.

<Scribing Wheel>
(16) A scribing wheel including the polycrystalline diamond according to any one of (1) to (5) above.

Advantages

Polycrystalline diamond according to the present invention does not wear unevenly and hence is applicable to diverse applications.

A water jet orifice according to the present invention can provide a cutting width with stability for a long period of time, compared with conventional orifices including monocrystalline diamonds and sintered diamond compacts containing metal binders.

A stylus for gravure printing, a scriber, a diamond cutting tool, and a scribing wheel according to the present invention allow stable working for a long period of time, compared with conventional tools including monocrystalline diamonds and sintered diamond compacts containing metal binders.

BEST MODES FOR CARRYING OUT THE INVENTION

Hereinafter, polycrystalline diamond according to the present invention is described in detail.

Polycrystalline diamond according to the present invention is substantially a single-phase diamond (purity of 99% or more) and does not contain a metal binder such as cobalt. Such polycrystalline diamond can be obtained by directly converting and simultaneously sintering non-diamond carbon serving as a material such as graphite, glassy carbon, or amorphous carbon into diamond under an ultrahigh pressure and at a high temperature (temperature: 1800° C. to 2600° C., pressure: 12 to 25 GPa) without a catalyst or a solvent. The resultant polycrystalline diamond does not wear unevenly, which does occur in monocrystals.

Note that a method is known by which polycrystalline diamond is produced from diamond powder or graphite serving as a material. Specifically, methods by which polycrystalline diamonds are produced from diamond powder serving as a material and polycrystalline diamonds obtained by these methods are disclosed in References 1 to 4 below.

[Reference 1] Japanese Unexamined Patent Application Publication No. 2006-007677
[Reference 2] Japanese Unexamined Patent Application Publication No. 2002-187775
[Reference 3] Japanese Patent No. 3855029
[Reference 4] Japanese Unexamined Patent Application Publication No. 2004-168554

Reference 1 discloses a polycrystalline diamond and the diamond grains constituting this polycrystalline diamond have an average grain diameter of 80 nm to 1 μm, which is in the range defined by the present invention. However, Ref 1 states that the polycrystalline diamond was obtained by the method described in Ref 2. Reference 2 states that polycrystalline diamond is produced by a method of sintering diamond powder with carbonate serving as a sintering aid and the carbonate remains in the resultant polycrystalline diamond after the sintering. Therefore, the structure of the polycrystalline diamond disclosed in Ref 1 is different from the structure of a polycrystalline diamond according to the present invention.

Another method of sintering diamond powder with a sintering aid is disclosed in Ref 3. However, Ref 3 states that it has been ascertained with IR spectra that the sintering aid partially remains in a polycrystalline diamond obtained by this method. Therefore, the structure of this polycrystalline diamond is also different from the structure of a polycrystalline diamond according to the present invention. Reference 4 states that the sinters of Refs. 2 and 3 are inferior in hardness to a sinter free from a sintering aid according to the present invention. Thus, Ref 4 shows that a sinter according to the present invention is excellent.

Reference 4 above also discloses a method for producing a polycrystalline diamond in which a sintering aid is not used. This method uses diamond micro powder as a starting material and the grain diameter of the resultant sinter is 100 nm or less, which is in the range defined by the present invention. However, non-diamond carbon is used as a starting material in the present invention. In particular, when a carbon material having a graphite-type layer structure is used as a starting material, a polycrystalline diamond can be provided having a special structure referred to as a lamellar structure, which is not present in the polycrystalline diamond of Ref 4. Reference 5 described below states that extension of cracks is suppressed in a region having the lamellar structure. This demonstrates that a polycrystalline diamond according to the present invention is less prone to breaking than that described in Ref 4.

In summary, polycrystalline diamond according to the present invention is totally different in structure from diamond sinters that have been disclosed and, as a result, has mechanical characteristics that are far superior to those of the latter.

The following are examples of references describing methods of obtaining polycrystalline diamonds in which a non-diamond carbon material serving as a starting material is converted and sintered without addition of a sintering aid or a catalyst at an ultrahigh pressure of 12 GPa or more and at a high temperature of 2200° C. or more, as in the present invention.

[Reference 5] SEI Technical Review, 165 (2004) 68 (Sumiya et al.)

[Reference 6] Japanese Unexamined Patent Application Publication No. 2007-22888

[Reference 7] Japanese Unexamined Patent Application Publication No. 2003-292397

Various tools were produced from diamonds obtained by the methods described in Refs. 5 to 7 above and the performance of the resultant tools was evaluated. Probably because the diamond described in Ref 5 contains abnormally grown grains having a diameter of about 10 times the average grain diameter and the diamond described in Ref 6 contains coarse diamond grains that are converted from an added coarse material, the evaluation revealed that portions having such coarse grains wear extremely rapidly.

Then, thorough studies on how to eliminate such portions wearing extremely rapidly were performed and it has been revealed that the diameter distribution of sintered grains constituting polycrystalline diamond needs to be controlled. Accordingly, various tools produced with grain diameter distributions being controlled had no grains wearing extremely rapidly and exhibited stable performance for a long period of time. The diamond described in Ref 7 has abnormal grain growth probably because its production method is similar to that in Ref 5. The diamond described in Ref 7 also has a problem similar to that in Ref 5.

The above-described problem can be solved by use of a polycrystalline diamond in which sintered grains constituting the polycrystalline diamond have an average grain diameter of more than 50 nm and less than 2500 nm and a purity of 99% or more, and the sinter has a D90 grain diameter of (average grain diameter+0.9×average grain diameter) or less. This is because abnormal wear is suppressed by making the D90 grain diameter of sintered grains of polycrystalline diamond be (average grain diameter+0.9× average grain diameter) or less.

The average grain diameter in the present invention is number-average grain diameter determined with a transmission electron microscope (TEM). The average grain diameter and the D90 grain diameter can be controlled by controlling the grain diameter of a starting material or sintering conditions.

The following are specific values for the average grain diameter and the D90 grain diameter that satisfy the above-described relationship in polycrystalline diamond.

Example 1: when the average grain diameter is 60 nm, the D90 grain diameter is 114 nm or less.

Example 2: when the average grain diameter is 100 nm, the D90 grain diameter is 190 nm or less.

Example 3: when the average grain diameter is 500 nm, the D90 grain diameter is 950 nm or less.

The D90 grain diameter is more preferably (average grain diameter+0.7×average grain diameter) or less, and still more preferably (average grain diameter+0.5×average grain diameter) or less.

When the average grain diameter is 50 nm or less or 2500 nm or more, the hardness becomes less than 100 GPa and wearing away is caused in a short period of time and hence a cutting width is not obtained with stability for a long period of time.

Hereinafter, a water jet orifice according to the present invention will be described in detail.

Since the material of an orifice according to the present invention is the above-described polycrystalline diamond according to the present invention, a water jet orifice according to the present invention does not wear unevenly, which does occur in orifices composed of monocrystals.

The inventors of the present invention produced orifices with diamonds obtained by the methods described in Refs. 5 to 7 above and determined the cutting widths of these orifices. This determination revealed that, the diamonds obtained in accordance with these References contain coarse grains as described above and hence portions corresponding to such coarse grains wear extremely rapidly. In this case, the velocity of flow of a water jet solvent decreases in such portions and the direction of the flow changes. As a result, the cutting width decreases or increases with the passage of cutting time and the cutting width is not stabilized, and hence a desired cutting width is not provided, which has been a problem.

The inventors have found that, to obtain a desired cutting width with stability, such portions wearing extremely rapidly need to be eliminated, and this is achieved by controlling the distribution of the grain diameters of a sinter. Specifically, grains wearing extremely rapidly are eliminated in an orifice composed of a diamond having a controlled distribution of grain diameters, the diamond being polycrystalline diamond according to the present invention in which the polycrystalline diamond has an average grain diameter of more than 50 nm and less than 2500 nm and a purity of 99% or more, and the sinter has a D90 grain diameter of (average grain diameter+0.9×average grain diameter) or less. Thus, the above-described problem has been solved with such an orifice and use of such an orifice can provide a desired cutting width with stability for a long period of time.

Polycrystalline diamond used for a water jet orifice according to the present invention preferably has an average grain diameter and a D90 grain diameter that respectively satisfy the above-described ranges.

The D90 grain diameter of a sinter is desirably selected in accordance with the average diameter of rigid particles contained in fluid used for water jetting. When the average diameter of rigid particles is substantially equal to or less than the average grain diameter of the structure of a sinter, a cutting width with stability is not provided for a long period of time. This is because rigid particles collide with not a plurality of but a single surface of a grain of a sinter upon collision with the structure of the sinter, and when the surface has a crystal orientation susceptible to wear, the grain wears extremely rapidly. For this reason, the D90 grain diameter of a sinter of an orifice is selected so as to be 1/10 or less of the diameter of rigid particles.

This is shown by the following example with specific values.

Example 4: when the diameter of rigid particles is 50 μm, the D90 is 5 μm or less.

Polycrystalline diamond constituting a water jet orifice preferably has a hardness of 100 GPa or more. When the polycrystalline diamond has a hardness of less than 100 GPa, the orifice has a shorter life.

The interior surface of an orifice bore through which water jet fluid passes preferably has a surface roughness Ra of 300 nm or less. When the surface roughness Ra is more than 300 nm, the orifice has a shorter life.

When an orifice bore formed in polycrystalline diamond has a diameter of 10 μm or more and 500 μm or less, the ratio (L/D) of an orifice level (L) to an orifice bore diameter (D) is preferably 10 to 500.

When an orifice bore formed in polycrystalline diamond has a diameter of more than 500 μm and 5000 μm or less, the ratio (L/D) of an orifice level (L) to an orifice bore diameter (D) is preferably 0.2 to 10.

Hereinafter, a stylus for gravure printing according to the present invention will be described in detail.

Since the material of a stylus for gravure printing according to the present invention is the above-described polycrystalline diamond according to the present invention, a stylus for gravure printing according to the present invention does not wear unevenly, which does occur in styluses composed of monocrystals.

The inventors of the present invention produced styluses with diamonds obtained by the methods described in Refs. 5 to 7 above and inspected the workability of these styluses. This inspection revealed that, the diamonds obtained by the methods described in these References contain coarse grains as described above and hence portions corresponding to such coarse grains wear extremely rapidly. In this case, such portions cause streaky scratches on metal being worked and hence a desired working is not possible, which has been a problem.

The inventors have found that, to allow a desired stable working, such portions wearing extremely rapidly needs to be eliminated, and this is achieved by controlling the distribution of the grain diameters of a sinter. Accordingly, a stylus including polycrystalline diamond having a controlled distribution of grain diameters according to the present invention was produced. Grains wearing extremely rapidly are eliminated in this stylus and a desired stable working was achieved with the stylus for a long period of time.

Polycrystalline diamond according to the present invention includes sintered diamond grains having a D90 grain diameter of (average grain diameter+0.9×average grain diameter) or less. As a result, abnormal wearing can be suppressed.

Polycrystalline diamond constituting a stylus for gravure printing preferably has a hardness of 100 GPa or more. When the polycrystalline diamond has a hardness of less than 100 GPa, the stylus has a shorter life. When the average grain diameter is 50 nm or less or 2500 nm or more, the hardness becomes less than 100 GPa and wearing away is caused in a short period of time and hence stable working is not possible for a long period of time.

Hereinafter, a scriber according to the present invention will be described in detail.

Since the material of a scriber according to the present invention is the above-described polycrystalline diamond according to the present invention, a stylus for gravure printing according to the present invention does not wear unevenly, which does occur in styluses composed of monocrystals.

Reference 1 above discloses a scriber composed of a polycrystalline diamond and the diamond grains constituting the polycrystalline diamond of this scriber have an average grain diameter of 80 nm to 1 μm, which is in the range defined by the present invention. However, as described above, a polycrystalline diamond produced by the production method described in Ref 1 (Ref 2) contains carbonate remaining after sintering. Therefore, such a polycrystalline diamond is different in structure from a polycrystalline diamond according to the present invention.

The inventors of the present invention produced scribers from diamonds obtained by the methods described in Refs. 5 to 7 above and inspected the workability of these scribers. This inspection revealed that, the diamonds obtained by the methods described in these References contain coarse grains as described above and hence portions corresponding to such coarse grains wear extremely rapidly.

The inventors have found that, to allow a desired stable working, such portions wearing extremely rapidly needs to be eliminated, and this is achieved by controlling the distribution of the grain diameters of a sinter. Accordingly, a scriber including a polycrystalline diamond having a controlled distribution of grain diameters according to the present invention was produced. Grains wearing extremely rapidly were eliminated in this scriber and a desired stable working was achieved with the scriber for a long period of time.

Polycrystalline diamond constituting a scriber preferably has a hardness of 100 GPa or more. When the average grain diameter is 50 nm or less or 2500 nm or more, the hardness becomes less than 100 GPa. When the hardness is less than 100 GPa, wearing away is caused in a short period of time and hence stable working is not possible for a long period of time and the scriber has a shorter life.

Hereinafter, a diamond cutting tool according to the present invention will be described in detail.

Since polycrystalline diamond serving as the material of a diamond tool according to the present invention is the above-described polycrystalline diamond according to the present invention, the polycrystalline diamond substantially being a single-phase diamond (purity of 99% or more) and not containing a metal binder such as cobalt. For this reason, a diamond cutting tool according to the present invention does not wear unevenly, which does occur in diamond tools including monocrystals.

The inventors of the present invention produced diamond tools from diamonds obtained by the methods described in Refs. 5 to 7 above and inspected the workability of these tools. This inspection revealed that, the diamonds obtained by the methods described in these References contain coarse grains as described above and hence portions corresponding to such coarse grains wear extremely rapidly. In this case, such portions cause streaky scratches or the like in metal being worked and hence a desired working is not possible, which has been a problem.

The inventors have found that, to allow a desired stable working, such portions wearing extremely rapidly needs to be eliminated, and this is achieved by controlling the distribution of the grain diameters of a sinter. Accordingly, a diamond tool including a polycrystalline diamond having a controlled distribution of grain diameters according to the present invention was produced. Grains wearing extremely rapidly were eliminated in this tool and a desired stable working was achieved with the tool for a long period of time.

Polycrystalline diamond constituting a diamond cutting tool preferably has a hardness of 100 GPa or more. When the polycrystalline diamond has a hardness of less than 100 GPa, wearing away is caused in a short period of time and hence stable working is not possible for a long period of time and such a diamond tool has a shorter life.

For this reason, the sintered grains of polycrystalline diamond are made to have an average grain diameter of more than 50 nm and less than 2500 nm and a hardness of 100 GPa or more. When the average grain diameter is 50 nm or less or 2500 nm or more, the hardness becomes less than 100 GPa.

The grains of a sinter are made to have a D90 grain diameter of (average grain diameter+0.9×average grain diameter) or less to suppress abnormal wearing.

Hereinafter, a scribing wheel according to the present invention will be described in detail.

Since polycrystalline diamond serving as the material of a scribing wheel according to the present invention is the above-described polycrystalline diamond according to the present invention, the polycrystalline diamond substantially being a single-phase diamond (purity of 99% or more) and not containing a metal binder such as cobalt. For this reason, a scribing wheel according to the present invention does not wear unevenly, which does occur in scribing wheels including monocrystals.

The inventors of the present invention produced scribing wheels from polycrystalline diamonds obtained by the methods described in Refs. 5 to 7 above and inspected the workability of these scribing wheels. This inspection revealed that, the diamonds obtained by the methods described in these References contain coarse grains as described above and hence portions corresponding to such coarse grains wear extremely rapidly.

The inventors have found that, to allow a desired stable working, such portions wearing extremely rapidly needs to be eliminated, and this is achieved by controlling the distribution of the grain diameters of a sinter. Accordingly, a scribing wheel including a polycrystalline diamond having a controlled distribution of grain diameters according to the present invention was produced. Grains wearing extremely rapidly were eliminated in this scribing wheel and a desired stable working was achieved with the scribing wheel for a long period of time.

Polycrystalline diamond constituting a scribing wheel preferably has a hardness of 100 GPa or more. When the average grain diameter is 50 nm or less or 2500 nm or more, the hardness becomes less than 100 GPa. When the hardness is less than 100 GPa, wearing away is caused in a short period of time and hence stable working is not achieved for a long period of time and the scribing wheel has a shorter life.

EXAMPLES

Hereinafter, the present invention is described with reference to examples in which polycrystalline diamond according to the present invention is used as materials for water jet orifices, styluses for gravure printing, scribers, diamond cutting tools, and scribing wheels.

Measurement methods and evaluation methods used in Examples and Comparative Examples will be described.
<Average Grain Diameter and D90 Grain Diameter>

The D50 grain diameters (average grain diameters) and the D90 grain diameters of graphite grains in fired graphite material and sintered diamond grains in polycrystalline diamond in the present invention are obtained by conducting image analysis on the basis of photographic images with a transmission electron microscope under a magnification of 100,000 to 500,000.

Hereinafter, this method is described in detail.

First, the distribution of the diameters of crystal grains constituting a sinter is determined on the basis of an image taken with a transmission electron microscope. Specifically, each grain is sampled, a sampled grain is subjected to binarization, and the area (S) of each grain is calculated with an image analysis software (for example, Scion Image manufactured by Scion Corporation). The diameter (D) of each grain is calculated as the diameter ($D=2\sqrt{S/\pi}$) of a circle having the same area as the grain.

Second, the thus-obtained distribution of grain diameters is processed with a data analysis software (for example, Origin manufactured by OriginLab Corporation, Mathchad manufactured by Parametric Technology Corporation, or the like) to calculate the D50 grain diameter and the D90 grain diameter.

A transmission electron microscope used in Examples and Comparative Examples described below was an H-9000 manufactured by Hitachi, Ltd.

<Hardness>

Hardness was measured in Examples and Comparative Examples with a Knoop indenter with a measurement load of 4.9 N.
<Surface Roughness>

The surface roughness of the interior surface of an orifice bore was adjusted by adjusting the particle diameters of a polishing agent for polishing the interior surface. Surface roughness was measured in accordance with JIS B0601 with a contact-type surface roughness tester. Since a measurement stylus cannot be inserted into an orifice bore, another orifice separately produced by the same processes was cut and measured.

Example 1

Water Jet Orifice

Examples of orifices according to embodiments of the present invention are described below.

Examples 1-1 to 1-3 are examples in which surface roughness was varied. Examples 1-4 to 1-6 are examples in which orifice bore diameter was varied. Examples 1-7 to 1-12 are examples in which average grain diameter and D90 grain diameter were varied. Examples 1-13 and 1-14 are examples in which both average grain diameter and orifice bore diameter were increased.

Example 1-1

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 200 μm, an orifice level of 5 mm, and a surface roughness Ra of 290 nm in the surface of the orifice bore. This orifice was evaluated for a water jet cutting property. The cutting time over which the orifice bore diameter was expanded to 300 μm was determined and it was a long time of 160 hours. For comparison purposes, an orifice composed of a sintered diamond having an average crystal grain diameter of 5 μm (containing a cobalt binder) was also evaluated for the same cutting property and the time was about 50 hours, which were extremely short.

Example 1-2

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 200 μm, an orifice level of 5 mm, and a surface roughness Ra of 50 nm in the surface of the orifice bore. This orifice was evaluated for a water jet cutting property. The cutting time over which the orifice bore diameter was expanded to 300 μm was determined and it was a long time of 240 hours. For comparison purposes, an orifice composed of a sintered diamond having an average crystal grain diameter of 5 μm (containing a cobalt binder) was also evaluated for the same cutting property and the time was about 70 hours, which were extremely short.

Example 1-3

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 200 μm, an orifice level of 5 mm, and a surface roughness Ra of 5 nm in the surface of the orifice bore. This orifice was evaluated for a water jet cutting property. The cutting time over which the orifice bore diameter was expanded to 300 μm was determined and it was a long time of 520 hours. For comparison purposes, an orifice composed of a sintered diamond having an average crystal grain diameter of 5 μm (containing a cobalt binder) was also evaluated for the same cutting property and the time was about 90 hours, which were extremely short.

Example 1-4

Graphite having an average grain diameter of 100 nm and a D90 grain diameter of 180 nm, which is (average grain diameter+0.9×average grain diameter), was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 450 μm, an orifice level of 5 mm, and a surface roughness Ra of 290 nm in the surface of the orifice bore. This orifice was evaluated for a water jet cutting property. The cutting time over which the orifice bore diameter was expanded to 550 μm was determined and it was a long time of 165 hours. For comparison purposes, an orifice composed of a sintered diamond having an average crystal grain diameter of 5 μm (containing a cobalt binder) was also evaluated for the same cutting property and the time was about 55 hours, which were extremely short.

Example 1-5

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 50 μm, an orifice level of 5 mm, and a surface roughness Ra of 290 nm in the surface of the orifice bore. This orifice was evaluated for a water jet cutting property. The cutting time over which the orifice bore diameter was expanded to 100 μm was determined and it was a long time of 210 hours. For comparison purposes, an orifice composed of a sintered diamond having an average crystal grain diameter of 5 μm (containing a cobalt binder) was also evaluated for the same cutting property and the time was about 75 hours, which were extremely short.

Example 1-6

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 15 μm, an orifice level of 7 mm, and a surface roughness Ra of 290 nm in the surface of the orifice bore. This orifice was evaluated for a water jet cutting property. The cutting time over which the orifice bore diameter was expanded to 30 μm was determined and it was a long time of 230 hours. For comparison purposes, an orifice composed of a sintered diamond having an average crystal grain diameter of 5 μm (containing a cobalt binder) was also evaluated for the same cutting property and the time was about 80 hours, which were extremely short.

Example 1-7

Graphite having an average grain diameter of 110 nm and a D90 grain diameter of 175 nm, which is (average grain diameter+0.7×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 230 nm and a D90 grain diameter of 380 nm was obtained. The thus-obtained polycrystalline diamond had an extremely high hardness of 115 GPa. An orifice was produced from this polycrystalline material, the orifice having an orifice bore diameter of 200 μm, an orifice level of 5 mm, and a surface roughness Ra of 280 nm in the surface of the orifice bore. This orifice was evaluated for a water jet cutting property. The cutting time over which the orifice bore diameter was expanded to 300 μm was determined and it was a long time of 180 hours.

Example 1-8

Graphite having an average grain diameter of 95 nm and a D90 grain diameter of 135 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 180 nm and a D90 grain diameter of 260 nm was obtained. The thus-obtained polycrystalline diamond had an extremely high hardness of 125 GPa. An orifice was produced from this polycrystalline material, the orifice having an orifice bore diameter of 200 μm, an orifice level of 5 mm, and a surface roughness Ra of 280 nm in the surface of the orifice bore. This orifice was evaluated for a water jet cutting property. The cutting time over which the orifice bore diameter was expanded to 300 μm was determined and it was a long time of 210 hours.

Example 1-9

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 55 nm and a D90 grain diameter of 80 nm was obtained. The thus-obtained polycrystalline diamond had an extremely high hardness of 105 GPa. An orifice was produced from this polycrystalline material, the orifice having an orifice bore diameter of 200 μm, an orifice level of 5 mm, and a surface roughness Ra of 250 nm in the surface of the orifice bore. This orifice was evaluated for a water jet cutting property. The cutting time over which the orifice bore diameter was expanded to 200 μm was determined and it was a long time of 130 hours.

Example 1-10

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 9 under a pressure condition under which diamond is thermodynamically stable. As a result, a polycrystalline diamond having an average grain diameter of 560 nm and a D90 grain diameter of 830 nm was obtained. The thus-obtained polycrystalline diamond had an extremely high hardness of 120 GPa. An orifice was produced from this polycrystalline material, the orifice having an orifice bore diameter of 200 μm, an orifice level of 5 mm, and a surface roughness Ra of 240 nm in the surface of the orifice bore. This orifice was evaluated for a water jet cutting property. The cutting time over which the orifice bore diameter was expanded to 300 μm was determined and it was a long time of 160 hours.

Example 1-11

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 9 under a pressure condition under which diamond is thermodynamically stable. As a result, a polycrystalline diamond having an average grain diameter of 1100 nm and a D90 grain diameter of 1600 nm was obtained. The thus-obtained polycrystalline diamond had an extremely high hardness of 112 GPa. An orifice was produced from this polycrystalline material, the orifice having an orifice bore diameter of 200 μm, an orifice level of 5 mm, and a surface roughness Ra of 250 nm in the surface of the orifice bore. This orifice was evaluated for a water jet cutting property. The cutting time over which the orifice bore diameter was expanded to 300 μm was determined and it was a long time of 150 hours.

Example 1-12

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 9 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. An orifice was produced from this polycrystalline material, the orifice having an orifice bore diameter of 200 μm, an orifice level of 5 mm, and a surface roughness Ra of 270 nm in the surface of the orifice bore. This orifice was evaluated for a water jet cutting property. The cutting time over which the orifice bore diameter was expanded to 300 μm was determined and it was a long time of 110 hours.

Example 1-13

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 9 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. An orifice was produced from this polycrystalline material, the orifice having an orifice bore diameter of 1500 μm, an orifice level of 5 mm, and a surface roughness Ra of 270 nm in the surface of the orifice bore. This orifice was evaluated for a water jet cutting property. The cutting time over which the orifice bore diameter was expanded to 2000 μm was determined and it was a long time of 210 hours.

Example 1-14

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 9 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. An orifice was produced from this polycrystalline material, the orifice having an orifice bore diameter of 3500 μm, an orifice level of 0.7 mm, and a surface roughness Ra of 270 nm in the surface of the orifice bore. This orifice was evaluated for a water jet cutting property. The cutting time over which the orifice bore diameter was expanded to 4500 μm was determined and it was a long time of 160 hours.

Comparative Example 1-1

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An orifice was produced from this polycrystalline material, the orifice having an orifice bore diameter of 200 μm, an orifice level of 5 mm, and a surface roughness Ra of 350 nm in the surface of the orifice bore. This orifice was evaluated for a water jet cutting property. The cutting time over which the orifice bore diameter was expanded to 300 μm was determined and it was a short time of 95 hours.

Comparative Example 1-2

Graphite having an average grain diameter of 100 nm and a D90 grain diameter of 210 nm, which is about (average grain diameter+1.1×average grain diameter), was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 400 nm was obtained. The thus-obtained polycrystalline diamond had an extremely high hardness of 112 GPa. An orifice was produced from this polycrystalline material, the orifice having an orifice bore diameter of 200 μm, an orifice level of 5 mm, and a surface roughness Ra of 290 nm in the surface of the orifice bore. This orifice was evaluated for a water jet cutting property. The cutting time over which the orifice bore diameter was expanded to 300 μm was determined and it was a short time of 90 hours.

Comparative Example 1-3

Graphite having an average grain diameter of 20 nm and a D90 grain diameter of 37 nm, which is about (average grain diameter+0.9×average grain diameter), was prepared as non-diamond carbon serving as the material of diamond. This material was directly converted and sintered into diamond under a pressure condition under which diamond is thermodynamically stable. As a result, a polycrystalline diamond having an average grain diameter of 45 nm and a D90 grain diameter of 80 nm was obtained. The thus-obtained polycrystalline diamond had a hardness of 95 GPa and was slightly soft. An orifice was produced from this polycrystalline material, the orifice having an orifice bore diameter of 200 μm, an orifice level of 5 mm, and a surface roughness Ra of 250 nm in the surface of the orifice bore. This orifice was evaluated for a water jet cutting property. The cutting time over which the orifice bore diameter was expanded to 300 μm was determined and it was a short time of 80 hours.

Comparative Example 1-4

Graphite having an average grain diameter of 100 nm and a D90 grain diameter of 180 nm, which is about (average grain diameter+0.9×average grain diameter), was prepared as non-diamond carbon serving as the material of diamond. This material was directly converted and sintered into diamond under a pressure condition under which diamond is thermodynamically stable over a long period of time. As a result, a polycrystalline diamond having an average grain diameter of 2700 nm and a D90 grain diameter of 3900 nm was obtained. The thus-obtained polycrystalline diamond had a hardness of 91 GPa and was slightly soft. An orifice was produced from this polycrystalline material, the orifice having an orifice bore diameter of 200 μm, an orifice level of 5 mm, and a surface roughness Ra of 240 nm in the surface of the orifice bore. This orifice was evaluated for a water jet cutting property. The cutting time over which the orifice bore diameter was expanded to 300 μm was determined and it was a short time of 85 hours.

Table I shows values of the sintered grains of the polycrystalline diamonds in Examples and Comparative Examples above in terms of average grain diameter, D90 grain diameter, a coefficient (K), hardness, and wear life. Note that the coefficient (K) is defined by Equation (1) below.

$$D90 \text{ grain diameter} = \text{average grain diameter} + \text{average grain diameter} \times K \quad (1)$$

TABLE 1

| | Average grain diameter (nm) | D90 (nm) | Coefficient | Hardness (GPa) | Surface roughness (nm) | Orifice bore diameter (D) (μs) | Orifice level (L) (mm) | L/D *[1] | Life hour (H) | Life of Co-containing diamond hour (H) |
|---|---|---|---|---|---|---|---|---|---|---|
| Example 1-1 | 200 | 370 | 0.85 | 110 | 290 | 200 | 5 | 25 | 160 | 50 |
| Example 1-2 | 200 | 370 | 0.85 | 110 | 50 | 200 | 5 | 25 | 240 | 70 |
| Example 1-3 | 200 | 370 | 0.85 | 110 | 5 | 200 | 5 | 25 | 520 | 90 |
| Example 1-4 | 200 | 370 | 0.85 | 110 | 290 | 450 | 5 | 11 | 165 | 55 |
| Example 1-5 | 200 | 370 | 0.85 | 110 | 290 | 50 | 5 | 100 | 210 | 75 |
| Example 1-6 | 200 | 370 | 0.85 | 110 | 290 | 15 | 7 | 467 | 230 | 80 |
| Example 1-7 | 230 | 380 | 0.65 | 115 | 280 | 200 | 5 | 25 | 180 | — |
| Example 1-8 | 180 | 260 | 0.44 | 125 | 280 | 200 | 5 | 25 | 210 | — |
| Example 1-9 | 55 | 80 | 0.45 | 105 | 250 | 200 | 5 | 25 | 130 | — |
| Example 1-10 | 560 | 830 | 0.48 | 120 | 240 | 200 | 5 | 25 | 160 | — |
| Example 1-11 | 1100 | 1600 | 0.45 | 112 | 250 | 200 | 5 | 25 | 150 | — |

TABLE 1-continued

|  | Average grain diameter (nm) | D90 (nm) | Coefficient | Hardness (GPa) | Surface roughness (nm) | Orifice bore diameter (D) (μs) | Orifice level (L) (mm) | L/D *1) | Life hour (H) | Life of Co-containing diamond hour (H) |
|---|---|---|---|---|---|---|---|---|---|---|
| Example 1-12 | 2400 | 3500 | 0.46 | 102 | 270 | 200 | 5 | 25 | 110 | — |
| Example 1-13 | 2400 | 3500 | 0.46 | 102 | 270 | 1500 | 5 | 3 | 210 | — |
| Example 1-14 | 2400 | 3500 | 0.46 | 102 | 270 | 3500 | 0.7 | 0.2 | 160 | — |
| Comparative Example 1-1 | 200 | 370 | 0.85 | 110 | 350 | 200 | 5 | 25 | 95 | — |
| Comparative Example 1-2 | 200 | 400 | 1.00 | 112 | 290 | 200 | 5 | 25 | 90 | — |
| Comparative Example 1-3 | 45 | 80 | 0.78 | 95 | 250 | 200 | 5 | 25 | 80 | — |
| Comparative Example 1-4 | 2700 | 3900 | 0.44 | 91 | 240 | 200 | 5 | 25 | 85 | — |

*1) L/D = orifice level (L)/orifice bore diameter (D)

Example 2

Stylus for Gravure Printing

Examples of styluses for gravure printing according to the present invention and Comparative Examples are described below.

An evaluation method for styluses in terms of wear resistance will be described.

<Evaluation of Wear Resistance>

A stylus having an included angle of 120° was produced from polycrystalline diamond obtained. A copper workpiece was worked with this stylus being driven at a frequency of 8 kHz and working time over which wear depth in an edge line portion on one side was increased to 10 μm was determined. The wear resistance of the stylus was evaluated on the basis of this working time defined as the wear life of the stylus.

Example 2-1

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. A stylus produced from this polycrystalline diamond had a long wear life of 240 hours. For comparison purposes, a stylus composed of monocrystalline diamond was evaluated for the same working property and the time was about 60 hours, which were extremely short.

Example 2-2

Graphite having an average grain diameter of 110 nm and a D90 grain diameter of 175 nm, which is (average grain diameter+0.7×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 230 nm and a D90 grain diameter of 380 nm was obtained. The thus-obtained polycrystalline diamond had an extremely high hardness of 115 GPa. A stylus produced from this polycrystalline diamond had a long wear life of 280 hours.

Example 2-3

Graphite having an average grain diameter of 95 nm and a D90 grain diameter of 135 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 180 nm and a D90 grain diameter of 260 nm was obtained. The thus-obtained polycrystalline diamond had an extremely high hardness of 125 GPa. A stylus produced from this polycrystalline diamond had a long wear life of 320 hours.

Example 2-4

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 55 nm and a D90 grain diameter of 80 nm was obtained. The thus-obtained polycrystalline diamond had an extremely high hardness of 105 GPa. A stylus having an included angle of 120° was produced from the obtained polycrystalline diamond. This stylus produced from the polycrystalline diamond had a long wear life of 200 hours.

Example 2-5

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 4 under a pressure condition under which diamond is thermodynamically stable. As a result, a polycrystalline diamond having an average grain diameter of 560 nm and a D90 grain diameter of 830 nm was obtained. The thus-obtained polycrystalline diamond had an extremely high hardness of 120 GPa. A stylus produced from this polycrystalline diamond had a long wear life of 180 hours.

Example 2-6

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 5 under a pressure condition under which diamond is thermodynamically stable. As a result, a polycrystalline diamond having an average grain diameter of 1100 nm and a D90 grain diameter of 1600 nm was obtained. The thus-obtained polycrystalline diamond had an extremely high hardness of 112 GPa. A stylus produced from this polycrystalline diamond had a long wear life of 170 hours.

Example 2-7

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 6 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. A stylus produced from this polycrystalline diamond had a long wear life of 150 hours.

Comparative Example 2-1

Graphite having an average grain diameter of 100 nm and a D90 grain diameter of 210 nm, which is (average grain diameter+1.1×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 400 nm was obtained. The thus-obtained polycrystalline diamond had an extremely high hardness of 112 GPa. A stylus produced from this polycrystalline diamond had a short wear life of 90 hours.

Comparative Example 2-2

Graphite having an average grain diameter of 20 nm and a D90 grain diameter of 37 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 45 nm and a D90 grain diameter of 80 nm was obtained. The thus-obtained polycrystalline diamond had a hardness of 95 GPa and was slightly soft. A stylus produced from this polycrystalline diamond had a short wear life of 85 hours.

Comparative Example 2-3

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 2700 nm and a D90 grain diameter of 3900 nm was obtained. The thus-obtained polycrystalline diamond had a hardness of 91 GPa and was slightly soft. A stylus produced from this polycrystalline diamond had a short wear life of 70 hours.

Comparative Example 2-4

A stylus produced from monocrystalline diamond serving as a material was tested for wear resistance in the same manner as in Example 1 and this stylus had a wear life of 60 hours.

Table II shows values of the sintered grains of the polycrystalline diamonds in Examples and Comparative Examples above in terms of average grain diameter, D90 grain diameter, the coefficient (K), hardness, and wear life. Note that the coefficient (K) is defined by Eq. (1) above.

TABLE II

| | Average grain diameter nm | D90 nm | Coefficient (K) | Hardness GPa | Wear life hour (H) |
|---|---|---|---|---|---|
| Example 2-1 | 200 | 370 | 0.85 | 110 | 240 |
| Example 2-2 | 230 | 380 | 0.65 | 115 | 280 |
| Example 2-3 | 180 | 260 | 0.44 | 125 | 320 |
| Example 2-4 | 55 | 80 | 0.45 | 105 | 200 |
| Example 2-5 | 560 | 830 | 0.48 | 120 | 180 |
| Example 2-6 | 1100 | 1600 | 0.45 | 112 | 170 |
| Example 2-7 | 2400 | 3500 | 0.46 | 102 | 150 |
| Comparative Example 2-1 | 200 | 400 | 1.00 | 112 | 90 |
| Comparative Example 2-2 | 45 | 80 | 0.78 | 95 | 85 |
| Comparative Example 2-3 | 2700 | 3900 | 0.44 | 91 | 70 |
| Comparative Example 2-4 | — | — | — | — | 60 |

Example 3

Scriber

Examples of scribers according to the present invention and Comparative Examples are described below.

An evaluation method for scribers in terms of wear resistance will be described.
<Evaluation of Wear Resistance>

A 4-point scriber was produced from polycrystalline material obtained and it was subjected to a wear test where a sapphire substrate was scribed with the scriber under a load of 50 g, at a scribing speed of 1 cm/min, and for a scribing distance of 1 m. The wear resistance of the scriber was evaluated on the basis of abrasion loss in the test.

Example 3-1

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. An abrasion loss of a scriber produced from this polycrystalline diamond was extremely small and it was about 1/70 of that of a scriber composed of monocrystalline diamond.

Example 3-2

Graphite having an average grain diameter of 110 nm and a D90 grain diameter of 175 nm, which is (average grain diameter+0.7×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 230 nm and a D90 grain diameter of 380 nm was obtained. The thus-obtained polycrystalline diamond had an extremely high hardness of 115 GPa. An abrasion loss of a scriber produced from this polycrystalline diamond was extremely small and it was about 1/80 of that of a scriber composed of monocrystalline diamond.

Example 3-3

Graphite having an average grain diameter of 95 nm and a D90 grain diameter of 135 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 180 nm and a D90 grain diameter of 260 nm was obtained. The thus-obtained polycrystalline diamond had an extremely high hardness of 125 GPa. An abrasion loss of a scriber produced from this polycrystalline diamond was extremely small and it was about 1/90 of that of a scriber composed of monocrystalline diamond.

Example 3-4

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 55 nm and a D90 grain diameter of 80 nm was obtained. The thus-obtained polycrystalline diamond had an extremely high hardness of 105 GPa. An abrasion loss of a scriber produced from this polycrystalline diamond was extremely small and it was about 1/60 of that of a scriber composed of monocrystalline diamond.

Example 3-5

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 4 under a pressure condition under which diamond is thermodynamically stable. As a result, a polycrystalline diamond having an average grain diameter of 560 nm and a D90 grain diameter of 830 nm was obtained. The thus-obtained polycrystalline diamond had an extremely high hardness of 120 GPa. An abrasion loss of a scriber produced from this polycrystalline diamond was extremely small and it was about 1/50 of that of a scriber composed of monocrystalline diamond.

Example 3-6

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 5 under a pressure condition under which diamond is thermodynamically stable. As a result, a polycrystalline diamond having an average grain diameter of 1100 nm and a D90 grain diameter of 1600 nm was obtained. The thus-obtained polycrystalline diamond had an extremely high hardness of 112 GPa. An abrasion loss of a scriber produced from this polycrystalline diamond was extremely small and it was about 1/50 of that of a scriber composed of monocrystalline diamond.

Example 3-7

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 6 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. An abrasion loss of a scriber produced from this polycrystalline diamond was extremely small and it was about 1/40 of that of a scriber composed of monocrystalline diamond.

Comparative Example 3-1

Graphite having an average grain diameter of 100 nm and a D90 grain diameter of 210 nm, which is (average grain diameter+1.1×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 400 nm was obtained. The thus-obtained polycrystalline diamond had an extremely high hardness of 112 GPa. An abrasion loss of a scriber produced from this polycrystalline diamond was about 1/4 of that of a scriber composed of monocrystalline diamond.

Comparative Example 3-2

Graphite having an average grain diameter of 20 nm and a D90 grain diameter of 37 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 45 nm and a D90 grain diameter of 80 nm was obtained. The thus-obtained polycrystalline diamond had a hardness of 95 GPa and was slightly soft. An abrasion loss of a scriber produced from this polycrystalline diamond was about ⅓ of that of a scriber composed of monocrystalline diamond.

Comparative Example 3-3

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 2700 nm and a D90 grain diameter of 3900 nm was obtained. The thus-obtained polycrystalline diamond had a hardness of 91 GPa and was slightly soft. An abrasion loss of a scriber produced from this polycrystalline diamond was about ½ of that of a scriber composed of monocrystalline diamond.

Table III shows values of the sintered grains of the polycrystalline diamonds in Examples and Comparative Examples above in terms of average grain diameter, D90 grain diameter, the coefficient (K), hardness, and abrasion loss. Note that the coefficient (K) is defined by Eq. (1) above.

TABLE III

|  | Average grain diameter [nm] | D90 [nm] | Co-efficient (K) | Hardness [Gpa] | Abrasion loss Ratio relative to monocrystal (reciprocal) |
|---|---|---|---|---|---|
| Example 3-1 | 200 | 370 | 0.85 | 110 | 68.0 |
| Example 3-2 | 230 | 380 | 0.65 | 115 | 79.3 |
| Example 3-3 | 180 | 260 | 0.44 | 125 | 90.7 |
| Example 3-4 | 55 | 80 | 0.45 | 105 | 56.7 |
| Example 3-5 | 560 | 830 | 0.48 | 120 | 51.0 |
| Example 3-6 | 1100 | 1600 | 0.45 | 112 | 48.2 |
| Example 3-7 | 2400 | 3500 | 0.46 | 102 | 42.5 |
| Comparative Example 3-1 | 200 | 400 | 1.00 | 112 | 3.6 |
| Comparative Example 3-2 | 45 | 80 | 0.78 | 95 | 3.4 |
| Comparative Example 3-3 | 2700 | 3900 | 0.44 | 91 | 2.8 |

Example 4

Diamond Cutting Tool

Examples of diamond cutting tools according to embodiments of the present invention are described below.

An evaluation method for diamond cutting tools in terms of wear resistance will be described.
<Wear Resistance (Tool Life)>

Cutting tools having an edge included angle of 90° and an edge R of 100 nm were produced from polycrystalline diamonds obtained in Examples and Comparative Examples and these cutting tools were used to form grooves having a depth of 5 μm and a pitch of 5 μm in a metal plate that was a copper plate on which nickel was plated. The wear resistance on the cutting tools was evaluated on the basis of time (tool life) over which the edges of the cutting tools wore down to about 1 μm.

Example 4-1

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. A cutting tool produced from this polycrystalline diamond had an extremely long tool life of 15 hours.

Example 4-2

Graphite having an average grain diameter of 110 nm and a D90 grain diameter of 175 nm, which is (average grain diameter+0.7×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 230 nm and a D90 grain diameter of 380 nm was obtained. The thus-obtained polycrystalline diamond had an extremely high hardness of 115 GPa. A cutting tool produced from this polycrystalline diamond had an extremely long tool life of 18 hours.

Example 4-3

Graphite having an average grain diameter of 95 nm and a D90 grain diameter of 135 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 180 nm and a D90 grain diameter of 260 nm was obtained. The thus-obtained polycrystalline diamond had an extremely high hardness of 125 GPa. A cutting tool produced from this polycrystalline diamond had an extremely long tool life of 20 hours.

Example 4-4

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 55 nm and a D90 grain diameter of 80 nm was obtained. The thus-obtained polycrystalline diamond had an extremely high hardness of 105 GPa. A cutting tool produced from this polycrystalline diamond had an extremely long tool life of 13 hours.

Example 4-5

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 4 under a pressure condition under which diamond is thermodynamically stable. As a result, a polycrystalline diamond having an average grain diameter of 560 nm and a D90 grain diameter of 830 nm was obtained. The thus-obtained polycrystalline diamond had an extremely high hardness of 120 GPa. A cutting tool produced from this polycrystalline diamond had an extremely long tool life of 11 hours.

Example 4-6

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 5 under a pressure condition under which diamond is thermodynamically stable. As a result, a polycrystalline diamond having an average grain diameter of 1100 nm and a D90 grain diameter of 1600 nm was obtained. The thus-obtained polycrystalline diamond had an extremely high hardness of 112 GPa. A cutting tool produced from this polycrystalline diamond had an extremely long tool life of 10 hours.

Example 4-7

Graphite having an average grain diameter of 30 nm and a D90 grain diameter of 40 nm, which is (average grain diameter+0.5×average grain diameter) or less, was prepared as non-diamond carbon serving as the material of diamond. This material was directly converted and sintered into diamond over a longer time than in Example 6 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. A cutting tool produced from this polycrystalline diamond had an extremely long tool life of 9 hours.

Comparative Example 4-1

Graphite having an average grain diameter of 100 nm and a D90 grain diameter of 210 nm, which is (average grain diameter+1.1×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 200 nm and a D90 grain diameter of 400 nm was obtained. The thus-obtained polycrystalline diamond had an extremely high hardness of 112 GPa. A cutting tool produced from this polycrystalline diamond had a tool life of 6 hours.

Comparative Example 4-2

Graphite having an average grain diameter of 20 nm and a D90 grain diameter of 37 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 45 nm and a D90 grain diameter of 80 nm was obtained. The thus-obtained polycrystalline diamond had a hardness of 95 GPa and was slightly soft. A cutting tool produced from this polycrystalline diamond had a tool life of 5 hours.

Comparative Example 4-3

Graphite having an average grain diameter of 100 nm and a D90 grain diameter of 180 nm, which is (average grain diameter+0.9×average grain diameter) or less, was prepared as non-diamond carbon serving as the material of diamond. This material was directly converted and sintered into diamond under a pressure condition under which diamond is thermodynamically stable. As a result, a polycrystalline diamond having an average grain diameter of 2700 nm and a D90 grain diameter of 3900 nm was obtained. The thus-obtained polycrystalline diamond had a hardness of 91 GPa and was slightly soft. A cutting tool produced from this polycrystalline diamond had a tool life of 4 hours.

Comparative Example 4-4

A tool produced from monocrystalline diamond serving as a material was tested for wear resistance in the same manner as in Example 1 and this tool had a tool life of 3 hours.

Table IV shows the values of the sintered grains of the polycrystalline diamonds in Examples and Comparative Examples above in terms of average grain diameter, D90 grain diameter, the coefficient (K), hardness, and tool life. Note that the coefficient (K) is defined by Eq. (1) above.

TABLE IV

| | Average grain diameter [nm] | D90 grain diameter [nm] | Co-efficient (K) | Hardness [Gpa] | Tool life [Hr] |
|---|---|---|---|---|---|
| Example 4-1 | 200 | 370 | 0.85 | 110 | 15 |
| Example 4-2 | 230 | 380 | 0.65 | 115 | 18 |
| Example 4-3 | 180 | 260 | 0.44 | 125 | 20 |
| Example 4-4 | 55 | 80 | 0.45 | 105 | 13 |
| Example 4-5 | 560 | 830 | 0.48 | 120 | 11 |
| Example 4-6 | 1100 | 1600 | 0.45 | 112 | 10 |
| Example 4-7 | 2400 | 3500 | 0.46 | 102 | 9 |
| Comparative Example 4-1 | 200 | 400 | 1.00 | 112 | 6 |
| Comparative Example 4-2 | 45 | 80 | 0.78 | 95 | 5 |
| Comparative Example 4-3 | 2700 | 3900 | 0.44 | 91 | 4 |
| Comparative Example 4-4 | — | — | — | — | 3 |

Example 5

Scribing Wheel

Examples of scribing wheels according to embodiments of the present invention are described below.

An evaluation method for scribing wheels in terms of a scribing property will be described.
<Evaluation of Scribing Property>
Scribing wheels having a diameter of 3 mm, a thickness of 0.8 mm, and an edge included angle of 120° were produced from polycrystalline diamonds obtained in Examples and Comparative Examples. These scribing wheels were used to scribe glass substrates and the scribing property of the scribing wheels was evaluated by determining scribed distances.

Example 5-1

Graphite having an average grain diameter of 100 nm and a D90 grain diameter of 180 nm, which is (average grain diameter+0.9×average grain diameter) or less, was prepared as the material of diamond. This material was directly converted and sintered into diamond under a pressure condition under which diamond is thermodynamically stable. As a result, a polycrystalline diamond having an average grain diameter of 200 nm and a D90 grain diameter of 370 nm was obtained. The thus-obtained polycrystalline diamond had an extremely high hardness of 110 GPa. The resultant polycrystalline material was evaluated in terms of scribing. As a result, scribing for a long distance of about 300 km was achieved with this polycrystalline diamond.

Example 5-2

Graphite having an average grain diameter of 110 nm and a D90 grain diameter of 175 nm, which is (average grain diameter+0.7×average grain diameter) or less, was prepared as the material of diamond. This material was directly converted and sintered into diamond under a pressure condition under which diamond is thermodynamically stable. As a result, a polycrystalline diamond having an average grain diameter of 230 nm and a D90 grain diameter of 380 nm was obtained. The thus-obtained polycrystalline diamond had an extremely high hardness of 115 GPa. The resultant polycrystalline material was evaluated in terms of scribing. As a result, scribing for a long distance of about 350 km was achieved with this polycrystalline diamond.

Example 5-3

Graphite having an average grain diameter of 95 nm and a D90 grain diameter of 135 nm, which is (average grain diameter+0.5×average grain diameter) or less, was prepared as the material of diamond. This material was directly converted and sintered into diamond under a pressure condition under which diamond is thermodynamically stable. As a result, a polycrystalline diamond having an average grain diameter of 180 nm and a D90 grain diameter of 260 nm was obtained. The thus-obtained polycrystalline diamond had an extremely high hardness of 125 GPa. The resultant polycrystalline material was evaluated in terms of scribing. As a result, scribing for a long distance of about 400 km was achieved with this polycrystalline diamond.

Example 5-4

Graphite having an average grain diameter of 30 nm and a D90 grain diameter of 40 nm, which is (average grain diameter+0.5×average grain diameter) or less, was prepared as the material of diamond. This material was directly converted and sintered into diamond under a pressure condition under which diamond is thermodynamically stable. As a result, a polycrystalline diamond having an average grain diameter of 55 nm and a D90 grain diameter of 80 nm was obtained. The thus-obtained polycrystalline diamond had an extremely high hardness of 105 GPa. The resultant polycrystalline material was evaluated in terms of scribing. As a result, scribing for a long distance of about 250 km was achieved with this polycrystalline diamond.

Example 5-5

Graphite having an average grain diameter of 30 nm and a D90 grain diameter of 40 nm, which is (average grain diameter+0.5×average grain diameter) or less, was prepared as the material of diamond. This material was directly converted and sintered into diamond over a longer time than in Example 4 under a pressure condition under which diamond is thermodynamically stable. As a result, a polycrystalline diamond having an average grain diameter of 560 nm and a D90 grain diameter of 830 nm was obtained. The thus-obtained polycrystalline diamond had an extremely high hardness of 120 GPa. The resultant polycrystalline material was evaluated in terms of scribing. As a result, scribing for a long distance of about 230 km was achieved with this polycrystalline diamond.

Example 5-6

Graphite having an average grain diameter of 30 nm and a D90 grain diameter of 40 nm, which is (average grain diameter+0.5×average grain diameter) or less, was prepared as the material of diamond. This material was directly converted and sintered into diamond over a longer time than in Example 5 under a pressure condition under which diamond is thermodynamically stable. As a result, a polycrystalline diamond having an average grain diameter of 1100 nm and a D90 grain diameter of 1600 nm was obtained. The thus-obtained polycrystalline diamond had an extremely high hardness of 112 GPa. The resultant polycrystalline material was evaluated in terms of scribing. As a result, scribing for a long distance of about 210 km was achieved with this polycrystalline diamond.

Example 5-7

Graphite having an average grain diameter of 30 nm and a D90 grain diameter of 40 nm, which is (average grain diameter+0.5×average grain diameter) or less, was prepared as the material of diamond. This material was directly converted and sintered into diamond over a longer time than in Example 6 under a pressure condition under which diamond is thermodynamically stable. As a result, a polycrystalline diamond having an average grain diameter of 2400 nm and a D90 grain diameter of 3500 nm was obtained. The thus-obtained polycrystalline diamond had an extremely high hardness of 102 GPa. The resultant polycrystalline material was evaluated in terms of scribing. As a result, scribing for a long distance of about 190 km was achieved with this polycrystalline diamond.

Comparative Example 5-1

Graphite having an average grain diameter of 100 nm and a D90 grain diameter of 210 nm, which is (average grain diameter+1.1×average grain diameter) or less, was prepared as the material of diamond. This material was directly converted and sintered into diamond under a pressure condition under which diamond is thermodynamically stable. As a result, a polycrystalline diamond having an average grain diameter of 200 nm and a D90 grain diameter of 400 nm was obtained. The thus-obtained polycrystalline diamond had an extremely high hardness of 112 GPa. The resultant polycrystalline material was evaluated in terms of scribing. As a result, scribing for a short distance of about 120 km was barely conducted with this polycrystalline diamond.

Comparative Example 5-2

Graphite having an average grain diameter of 20 nm and a D90 grain diameter of 37 nm, which is (average grain diameter+0.9×average grain diameter) or less, was prepared as the material of diamond. This material was directly converted and sintered into diamond under a pressure condition under which diamond is thermodynamically stable. As a result, a polycrystalline diamond having an average grain diameter of 45 nm and a D90 grain diameter of 80 nm was obtained. The thus-obtained polycrystalline diamond had a hardness of 95 GPa and was slightly soft. The resultant polycrystalline material was evaluated in terms of scribing. As a result, scribing for a short distance of about 110 km was barely conducted with this polycrystalline diamond.

Comparative Example 5-3

Graphite having an average grain diameter of 100 nm and a D90 grain diameter of 180 nm, which is (average grain diameter+0.9×average grain diameter) or less, was prepared as the material of diamond. This material was directly converted and sintered into diamond under a pressure condition under which diamond is thermodynamically stable. As a result, a polycrystalline diamond having an average grain diameter of 2700 nm and a D90 grain diameter of 3900 nm was obtained. The resultant polycrystalline material was evaluated in terms of scribing. As a result, scribing for a short distance of about 90 km was barely conducted with this polycrystalline diamond.

Comparative Example 5-4

A scribing wheel was produced from monocrystalline diamond and evaluated in terms of scribing. As a result, scribing for a short distance of 100 km was barely conducted with this monocrystalline diamond.

Comparative Example 5-5

A scribing wheel was produced from a sintered diamond compact bound with metal and evaluated in terms of scribing. As a result, scribing for a short distance of 6 km was barely conducted with this sintered diamond compact.

Table V shows values of the sintered grains of the polycrystalline diamonds in Examples and Comparative Examples above in terms of average grain diameter, D90 grain diameter, the coefficient, hardness, and tool life. Note that the coefficient (K) is defined by Eq. (1) above.

TABLE V

| | Average grain diameter [nm] | D90 [nm] | Coefficient (K) | Hardness [GPa] | Scribed distance [km] |
|---|---|---|---|---|---|
| Example 5-1 | 200 | 370 | 0.85 | 110 | 300 |
| Example 5-2 | 230 | 380 | 0.65 | 115 | 350 |
| Example 5-3 | 180 | 260 | 0.44 | 125 | 400 |
| Example 5-4 | 55 | 80 | 0.45 | 105 | 250 |
| Example 5-5 | 560 | 830 | 0.48 | 120 | 230 |
| Example 5-6 | 1100 | 1600 | 0.45 | 112 | 210 |
| Example 5-7 | 2400 | 3500 | 0.46 | 102 | 190 |
| Comparative Example 5-1 | 200 | 400 | 1.00 | 112 | 120 |
| Comparative Example 5-2 | 45 | 80 | 0.78 | 95 | 110 |
| Comparative Example 5-3 | 2700 | 3900 | 0.44 | 91 | 90 |
| Comparative Example 5-4 | — | — | — | — | 100 |
| Comparative Example 5-5 | — | — | — | — | 6 |

INDUSTRIAL APPLICABILITY

Polycrystalline diamond used in the present invention is less prone to wear unevenly and allows stable working for a long period of time compared with conventional monocrystalline diamonds and sintered diamond compacts containing metal binders. Therefore, such polycrystalline diamond can be suitably applied to water jet orifices, styluses for gravure printing, scribers, cutting tools, and scribing wheels.

A water jet orifice according to the present invention can provide a cutting width with stability for a long period of time compared with conventional orifices and hence can be suitably used as an orifice for a water jet configured to expel fluid containing rigid particles (alumina or the like) at a high pressure to thereby cut or work workpieces.

The invention claimed is:

1. A method for manufacturing a polycrystalline diamond, the method comprising steps of:
   preparing non-diamond carbon having D90 grain diameter of (average grain diameter+average grain diameter×0.9) or less; and
   converting and sintering the non-diamond carbon under an ultrahigh pressure and at a high temperature without addition of a sintering aid or a catalyst, wherein:
   sintered diamond grains constituting the polycrystalline diamond have an average grain diameter of more than 50 nm and less than 2500 nm and a purity of 99% or more, and
   the sintered diamond grains have a D90 grain diameter of (average grain diameter+average grain diameter×0.9) or less.

2. The method for manufacturing the polycrystalline diamond according to claim 1, wherein the sintered diamond grains have a D90 grain diameter of (average grain diameter+average grain diameter×0.7) or less.

3. The method for manufacturing the polycrystalline diamond according to claim 1, wherein the sintered diamond grains have a D90 grain diameter of (average grain diameter+average grain diameter×0.5 ) or less.

4. The method for manufacturing the polycrystalline diamond according to claim 1, wherein the polycrystalline diamond has a hardness of 100 GPa or more.

5. The method for manufacturing the polycrystalline diamond according to claim 1, wherein the non-diamond carbon is a carbon material having a graphite-type layer structure.

* * * * *